Patented Dec. 19, 1950

2,534,250

UNITED STATES PATENT OFFICE 2,534,250

PROCESS OF ISOLATING QUERCITRIN

Floyd De Eds, San Francisco, and Albert N. Booth, Berkeley, Calif., assignors to the United States of America as represented by the Secretary of Agriculture No Drawing. Application October 14, 1949, Serial No. 121,442

5 Claims. (Cl. 260—210)

(Granted under the act of March 3, 1883, as amended April 30, 1928; 370 O. G. 757)

This application is made under the act of March 3, 1883, as amended by the act of April 30, 1928, and the invention herein described, if patented in any country may be manufactured and used by or for the Government of the United States of America for governmental purposes throughout the world without the payment to us of any royalty thereon.

This invention relates to the isolation of quercitrin and quercetin from black oak bark extract or other quercitrin-containing source materials.

Quercitrin is useful for therapeutic purposes as it possesses the same type of physiological action as does rutin. Since quercitrin is the rhamnoside of quercetin it may be used for the preparation of quercetin by subjecting it to hydrolysis to split off the rhamnose portion of the molecule. Both quercitrin and quercetin are also useful as dyestuffs.

In accordance with this invention, quercitrin is isolated from materials containing the same, particularly from black oak bark. Particularly useful raw materials are the powdered black oak bark extracts sold in the open market as yellow dyestuffs. These solid products are generally prepared from black oak bark by extraction thereof with water, often under high pressure and temperature, followed by filtration of the extract, then evaporation to obtain the solid extract. This material is often referred to in the trade as quercitron or flavine. Although we prefer to use the powdered bark extract of commerce it is obvious we can use the black oak bark itself or any other product thereof which contains the quercitrin.

Methods are known for isolating quercitrin from black oak bark products but these known methods give low yields and/or involve cumbersome techniques. One known method (Morrow and Sandstrom, Biochemical Laboratory Methods, 2nd ed., 1935, pp. 231–2) involves the extraction of the solid bark extract with boiling water, purification of the aqueous extract with activated carbon, and crystallization of the quercitrin from the aqueous solution by cooling. This technique is cumbersome as it requires handling of enormous volumes of water as the quercitrin is soluble in water only to a limited extent. Another known method (Beilstein, Handbuch der Organischen Chemie, 4th ed., vol. XXXI, pp. 75–6) involves extracting the bark product with boiling 85% alcohol, treatment of the alcoholic extract with lead acetate to precipitate the impurities, removal of lead from the filtrate with hydrogen sulphide, evaporation of the purified filtrate to dryness and extraction of the residue with alcohol, precipitation of the quercitrin from the alcohol solution, and finally 4 or 5 recrystallizations from water. This process possesses the disadvantage that it involves a multiplicity of operations which renders it unfeasable for commercial operation.

We have now found that quercitrin may be isolated by a relatively simple and economical process wherein high yields (practically quantitative) of quercitrin are obtained in pure form. The process of this invention essentially involves two distinct steps, as follows:

In the first step, the quercitrin source material is extracted with an aqueous alcohol, the concentration of alcohol with respect to water being from about 5% to about 50%, by volume. The extract so obtained is discarded and the insoluble solid residue is retained. In this step, the gross impurities such as tannins are removed from the source material since they are soluble in the aqueous alcohol phase whereas the quercitrin is relatively insoluble in this phase. Although we prefer to use ethanol as the alcohol in this extraction procedure, other water-miscible alcohols may be used, for example, methanol, propanol, isopropanol, butanols, and so forth. In general, a large excess of aqueous alcohol is used to extract the impurities from the source material, i. e., about 8 to about 50 ml. of aqueous alcohol per gram of source material, depending on the type of source material and its content of quercitrin. The extraction is generally conducted at room temperature to decrease loss of quercitrin in the liquid phase. Further, in carrying out this extraction, it is preferred to first treat the source material with a concentrated alcohol, about 85% to 100%, for example, and then after thorough mixing is obtained as by agitation and/or standing, a measured amount of water is added to bring the alcohol concentration to the proper level as heretofore defined. It has been observed that by proceeding in this fashion, a more efficient extraction of impurities is obtained. It is obvious that the aqueous alcohol extracts may be subjected to distillation or other treatments to recover the alcohol.

The second step of the process involves extracting the solid material remaining from the first extraction with acetone. In this extraction the quercitrin goes into solution whereas the impurities remain undissolved. The concentration of acetone with respect to water may be from about 75% to 100%, 80% being preferred.

In this extraction it is preferred to have the acetone as hot as is possible without boiling away the acetone (about 50° C. is suitable) whereby the amount of solvent can be reduced to a minimum. The aqueous acetone extract so obtained is filtered while hot and the quercitrin recovered from the clear solution. This recovery may be obtained in several ways the preferred method involving adding an excess of water (say, about 1 to 4 volumes) thereto and then heating to evaporate off the acetone. During the evaporation the acetone vapors may be passed through a condenser to recover this solvent. The quercitrin which then precipitates out of solution is separated by filtration and dried.

If quercetin is the final product desired, then the quercitrin need not be isolated from the acetone extract. Instead, the acetone extract is treated with an acid to cause a hydrolysis whereby the quercitrin is converted into quercetin. An effective method for carrying out this hydrolysis involves adding 1 to 5% of concentrated sulphuric acid to the acetone extract, refluxing the reaction mixture for several hours to complete the hydrolysis and then separating the quercetin so formed. By proceeding in this manner, a substantially quantitative yield of pure, crystalline quercetin is obtained.

The following examples demonstrate particular conditions, steps, and materials within the scope of this invention. It is, of course, understood that these examples are merely illustrative and are not to be construed as a limitation of the invention to the particular details set forth.

EXAMPLE I

*(a) Extraction of impurities from bark extract*

Two hundred grams of powdered black oak bark extract was stirred vigorously into 330 ml. of 95% ethanol and then 5600 ml. of water was added to reduce the alcohol concentration to about 5%. The mixture was thoroughly agitated then allowed to stand for 24 hours. At the end of this time, the mixture was filtered on a vacuum filter to remove as much of the aqueous phase as possible.

*(b) Extraction of quercitrin*

The insoluble material from step *a* (crude quercitrin) was mixed with 600 ml. of anhydrous acetone. Due to the water content of the insoluble material, the concentration of acetone with respect to water was 81%. The mixture was heated to boiling and filtered while hot. The filtrate was poured into 3 liters of water and the acetone removed by heating the solution on a steam bath. The quercitrin which crystallized out was removed by filtration and dried in an oven at 110° C. A yield of 78 grams of crystalline quercitrin was obtained.

EXAMPLE II

*(a) Extraction of impurities from bark extract*

Two hundred grams of powdered black oak bark extract was stirred vigorously into 665 ml. of 95% ethanol and the suspension allowed to stand for 12 hours. Then, 1135 ml. of water was added and thoroughly mixed with the suspension thus making the alcohol concentration 35%. The suspension was then allowed to stand for 24 to 48 hours. At the end of this time, it was noted that a layer of greyish-yellow solid material had deposited at the bottom of the vessel. This material was recovered by decanting off the supernatant liquid.

*(b) Extraction of quercitrin*

The solid material from step *a* (crude quercitrin) was mixed with 750 ml. of hot (about 50° C). 80% acetone. The liquid was filtered while hot to remove undissolved impurities. The clear, dark-red filtrate containing the quercitrin was then poured into 3 liters of water and the acetone removed from the solution by heating on a steam bath. The quercitrin which crystallized out was removed by filtration and dried in an oven at 110° C. A yield of approximately 80 grams of the crystalline quercitrin was obtained. This yield represents substantially all the quercitrin originally present in the starting material.

EXAMPLE III

*(a) Extraction of impurities from bark extract*

Two hundred grams of powdered black oak bark extract was stirred vigorously into 330 ml. of 95% ethanol and then 5600 ml. of water was added to reduce the alcohol concentration to approximately 5%. The mixture was thoroughly agitated then allowed to stand for 24 hours. At the end of this time, the mixture was filtered using a vacuum filter.

*(b) Extraction of quercitrin*

The insoluble material from step *a* (crude quercitrin) was mixed with 600 ml. of anhydrous acetone. Because of the moisture present in the insoluble material, the concentration of acetone with respect to water was actually 81%. The mixture was heated to boiling and filtered while hot.

*(c) Preparation of quercetin*

The filtrate from step *b* (aqueous acetone solution of quercetin) was poured into 3 liters of water containing 40 ml. of concentrated sulphuric acid. The mixture was heated on a steam bath for 4 hours then filtered while hot. The crystalline quercetin collected on the filter was washed with water and dried in an oven at 110° C. A yield of 50 grams of crystalline quercetin was obtained.

Having thus described our invention, we claim:

1. A process of isolating quercitrin from source materials containing the same, comprising extracting the source material, at about room temperature, with an aqueous lower alkanol having a concentration from about 5% to about 50%, by volume, of alkanol, separating the undissolved material, and extracting it with hot acetone to obtain an acetone extract containing quercitrin.

2. The process of claim 1 wherein the alkanol is ethanol.

3. The process of claim 1 wherein the source material is the solid extract of black oak bark.

4. A process of isolating quercitrin from the solid extract of black oak bark, comprising mixing, at about room temperature, the solid extract of black oak bark with an aqueous lower alkanol of about 95% concentration, by volume, of alkanol, mixing sufficient water with the resulting mixture to bring the alkanol concentration to about 5%, by volume, while maintaining the mixture at about room temperature, separating the undissolved material, extracting it with hot acetone to obtain an acetone extract containing quercitrin, separating the acetone extract and mixing it with water, removing the acetone from the resulting aqueous acetone mixture by evaporation, and isolating the resulting precipitated quercitrin crystals.

5. A process for preparing quercetin comprising extracting a quercitrin-containing source material, at about room temperature, with an aqueous lower alkanol having a concentration from about 5% to about 50%, by volume, of alkanol, separating the undissolved material, extracting it with hot acetone to obtain an acetone extract containing quercitrin, subjecting the acetone extract to acid hydrolysis to produce quercetin, and isolating the quercetin so produced.

FLOYD DE EDS.
ALBERT N. BOOTH.

REFERENCES CITED

The following references are of record in the file of this patent:

Wester Rec. Trav. Chim. 40 (1921), pp. 708–710, 3 pages.